United States Patent
Nicholson et al.

(10) Patent No.: US 10,902,265 B2
(45) Date of Patent: Jan. 26, 2021

(54) IMAGING EFFECT BASED ON OBJECT DEPTH INFORMATION

(71) Applicant: Lenovo (Singapore) Pte. Ltd., Singapore (SG)

(72) Inventors: John Weldon Nicholson, Cary, NC (US); Daryl Cromer, Raleigh, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/366,498

(22) Filed: Mar. 27, 2019

(65) Prior Publication Data

US 2020/0311425 A1 Oct. 1, 2020

(51) Int. Cl.
*G06K 9/00* (2006.01)
*H04N 5/232* (2006.01)
*G06T 7/73* (2017.01)
*H04W 4/029* (2018.01)

(52) U.S. Cl.
CPC .......... *G06K 9/00671* (2013.01); *G06T 7/73* (2017.01); *H04N 5/23218* (2018.08); *H04N 5/232127* (2018.08); *H04W 4/029* (2018.02); *G06T 2207/10028* (2013.01)

(58) Field of Classification Search
None
See application file for complete search history.

(56) References Cited

U.S. PATENT DOCUMENTS

| | | | | |
|---|---|---|---|---|
| 6,100,895 A * | 8/2000 | Miura | ...... | G06T 15/80 345/426 |
| 6,466,219 B1 * | 10/2002 | Shino | ...... | G06T 15/005 345/531 |
| 6,580,427 B1 * | 6/2003 | Orenstein | ...... | G06T 15/405 345/422 |
| 6,885,378 B1 * | 4/2005 | Tsai | ...... | G06T 15/005 345/541 |
| 6,961,057 B1 * | 11/2005 | Van Dyke | ...... | G06T 15/405 345/422 |
| 7,027,659 B1 * | 4/2006 | Thomas | ...... | H04N 19/597 382/254 |
| 8,577,604 B1 * | 11/2013 | Ogale | ...... | G01C 21/32 382/190 |
| 10,586,203 B1 * | 3/2020 | Maldonado | ...... | G06K 9/6212 |
| 2002/0033829 A1 * | 3/2002 | Ohmori | ...... | G06T 15/005 345/552 |
| 2003/0011598 A1 * | 1/2003 | Klein | ...... | G06T 17/20 345/428 |
| 2004/0004620 A1 * | 1/2004 | Inada | ...... | G06T 15/40 345/501 |

(Continued)

Primary Examiner — Martin Mushambo
(74) Attorney, Agent, or Firm — Ference & Associates LLC

(57) ABSTRACT

One embodiment provides a method, including: determining, using a processor, a location of an information handling device; providing, using a camera of the information handling device, a camera view encompassing at least a portion of the location, wherein the portion encompassed by the camera view comprises at least one object; accessing a data store comprising depth information for the at least one object in the location; and leveraging the depth information to produce an imaging effect on the at least one object in the camera view of the portion. Other aspects are described and claimed.

18 Claims, 3 Drawing Sheets

(56) References Cited

U.S. PATENT DOCUMENTS

| | | | |
|---|---|---|---|
| 2004/0012586 A1* | 1/2004 | Inada | G06T 15/30 345/420 |
| 2004/0196284 A1* | 10/2004 | Huang | G06T 19/405 345/422 |
| 2011/0157155 A1* | 6/2011 | Turner | H04N 13/261 345/419 |
| 2012/0007940 A1* | 1/2012 | Michrowski | H04N 7/15 348/14.07 |
| 2012/0032948 A1* | 2/2012 | Lowe | G06T 7/70 345/419 |
| 2012/0206452 A1* | 8/2012 | Geisner | H04S 7/304 345/419 |
| 2012/0262445 A1* | 10/2012 | Bouie | G06F 3/14 345/419 |
| 2013/0002649 A1* | 1/2013 | Wu | G06T 19/006 345/419 |
| 2013/0023732 A1* | 1/2013 | Kim | G01B 11/25 600/166 |
| 2013/0044104 A1* | 2/2013 | Bouie | G09G 5/00 345/419 |
| 2013/0076749 A1* | 3/2013 | Maeda | H04N 13/128 345/424 |
| 2013/0100114 A1* | 4/2013 | Lynch | G06T 11/00 345/419 |
| 2013/0127823 A1* | 5/2013 | Diverdi | G06T 15/205 345/419 |
| 2013/0286004 A1* | 10/2013 | McCulloch | G06T 19/006 345/419 |
| 2013/0342526 A1* | 12/2013 | Ng | G06T 19/00 345/419 |
| 2015/0091900 A1* | 4/2015 | Yang | G06T 15/205 345/419 |
| 2016/0117829 A1* | 4/2016 | Yoon | G06K 9/4604 348/222.1 |
| 2016/0182887 A1* | 6/2016 | Gutierrez | G06T 7/593 348/46 |
| 2017/0061635 A1* | 3/2017 | Oberheu | G06T 7/586 |
| 2017/0091906 A1* | 3/2017 | Liang | G06T 7/11 |
| 2017/0094259 A1* | 3/2017 | Kouperman | G06T 7/596 |
| 2017/0094262 A1* | 3/2017 | Peterson | G06T 19/006 |
| 2017/0287216 A1* | 10/2017 | Kim | G06T 17/00 |
| 2017/0302903 A1* | 10/2017 | Ng | G06F 3/013 |
| 2017/0316572 A1* | 11/2017 | Tao | G06T 5/003 |
| 2017/0358092 A1* | 12/2017 | Bleibel | G06T 7/194 |
| 2018/0012417 A1* | 1/2018 | Haseltine | A63F 13/211 |
| 2018/0033209 A1* | 2/2018 | Akeley | H04N 13/106 |
| 2018/0211399 A1* | 7/2018 | Lee | G06F 30/00 |
| 2018/0217663 A1* | 8/2018 | Chandrasekhar | G06T 7/73 |
| 2019/0130532 A1* | 5/2019 | Ouyang | G06T 1/60 |
| 2019/0130533 A1* | 5/2019 | Ouyang | G06T 5/002 |
| 2019/0147662 A1* | 5/2019 | Nicholas | G06T 19/006 345/633 |
| 2019/0164256 A1* | 5/2019 | Ouyang | H04N 5/2226 |
| 2019/0272658 A1* | 9/2019 | Takahashi | G06T 3/40 |

* cited by examiner

US 10,902,265 B2

IMAGING EFFECT BASED ON OBJECT DEPTH INFORMATION

BACKGROUND

Modern information handling devices ("devices"), for example smart phones, tablets, notebooks, mixed reality head-mounted devices ("HMDs"), augmented reality HMDs, and the like, may comprise more than one worldview camera. The additional cameras may be additional RGB cameras, depth cameras, other camera types, a combination thereof, and the like. The presence of these additional cameras may increase the functionality of the device. For example, multiple cameras may be utilized to create various effects on captured photos and/or videos.

BRIEF SUMMARY

In summary, one aspect provides a method, comprising: determining, using a processor, a location of an information handling device; providing, using a camera of the information handling device, a camera view encompassing at least a portion of the location, wherein the portion encompassed by the camera view comprises at least one object; accessing a data store comprising depth information for the at least one object in the location; and leveraging the depth information to produce an imaging effect on the at least one object in the camera view of the portion.

Another aspect provides an information handling device, comprising: a camera; a memory device that stores instructions executable by the processor to: determine a location of the information handling device; provide, using the camera, a camera view encompassing at least a portion of the location, wherein the portion encompassed by the camera view comprises at least one object; access a data store comprising depth information for the at least one object in the location; and leverage the depth information to produce an imaging effect on the at least one object in the camera view of the portion.

A further aspect provides a product, comprising: a storage device that stores code, the code being executable by a processor and comprising: code that determines a location of an information handling device; code that provides a camera view encompassing at least a portion of the location, wherein the portion encompassed by the camera view comprises at least one object; and code that accesses a data store comprising depth information for the at least one object in the location; code that leverages the depth information to perform an imaging effect on the at least one object in the camera view of the portion.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
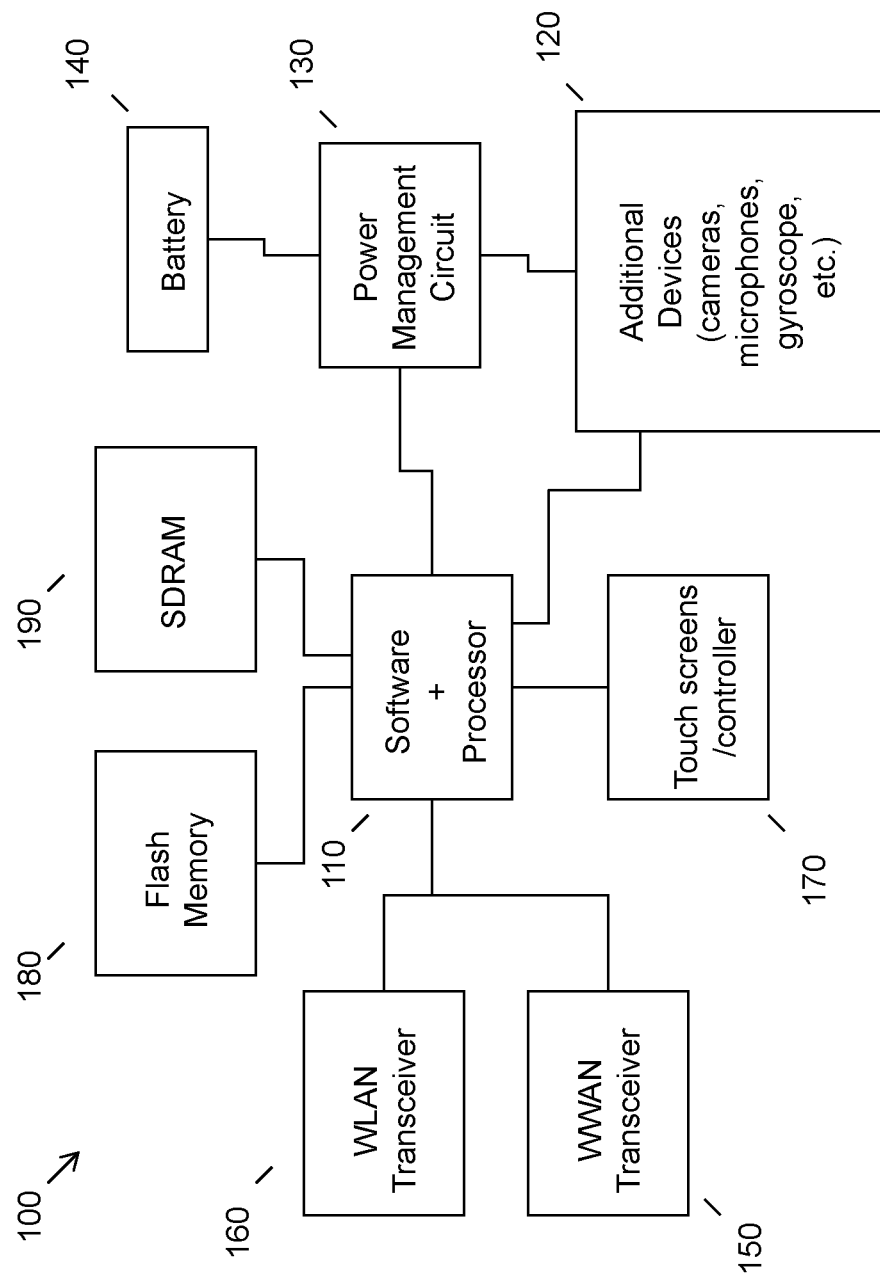
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

A popular imaging enhancement available to some smart devices is the portrait mode feature. Using this feature, a device may capture a sharp image of a target subject and blur the background around the subject. The blurred background may draw the eye to the subject, thereby eliminating distractions in the background. In this way, photographs taken with this feature may mimic the style and quality of those photographs captured by high-end cameras.

When first offered as an imaging feature on digital cameras (e.g., digital single lens reflex (DSLR) cameras, mirrorless cameras, etc.), the portrait mode allowed photographers to take better portraits by simply adjusting the camera settings. More particularly, a simple adjustment could be made to widen the lens aperture, which correspondingly blurs the background. However, such an adjustment could not be made on most conventional smartphone cameras because, at the very least, the aperture on most smartphone cameras is fixed, so they cannot be adjusted. Even on the few models that allow for an adjustable aperture, the lens and sensor inside a smartphone camera are too small to create the blur that many digital cameras are capable of producing.

Because smartphone manufacturers cannot fit a large digital camera sensor and lens inside a thin smartphone, other methods must be utilized to accomplish the portrait mode effect. Accordingly, a mix of hardware and software allow a smartphone to artificially apply blur to the background of an image to mimic the background blur produced by a digital camera. More particularly, many modern smartphones comprise an additional depth camera in addition to the conventional red-green-blue (RGB) camera. The depth camera may be utilized to obtain depth information for various objects situated in a field of view of the RGB camera. In this way, a device may be able to construct a three dimensional depth map of an area in front of it. With this information, the smartphone can then identify the borders of a foreground subject and thereafter apply an artificial blur on everything else, thereby accomplishing the portrait mode effect.

However, a primary issue with this technique is that it requires two cameras. As an initial matter, the presence of the second camera increases the overall cost of the device. Additionally, the second camera takes up additional space on the internal and external portions of the device, thereby creating various design challenges for manufacturers of the device. Furthermore, the depth mapping in the aforementioned technique is still not perfect in the sense that the smartphone may occasionally end up blurring the edges of the target subject.

Accordingly, an embodiment provides a method for producing depth-based camera effects without the presence of a second camera. In an embodiment, a location of a device may be determined and a camera view of at least part of the location may be provided. Responsive to accessing a data store, such as an augmented reality (AR) Point Cloud, comprising depth information for objects in the location, an embodiment may then leverage the depth information from the data store to perform a function in the camera view (e.g., enable a portrait mode feature, provide an AR effect, perform another depth-based function, etc.). Such a method may eliminate the requirement of a second camera to perform depth-based camera functions. Additionally, as the AR Point Cloud becomes more enriched with three-dimensional (3D) information over time, it may be even better than a second depth camera because it will have precise depth information for different objects and could therefore eliminate occurrences of subject edge blurring.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, etc. System 100 often includes one or more touch screens 170 for data input and display/rendering. System 100 also typically includes various memory devices, for example flash memory 180 and SDRAM 190.

Figure 2:
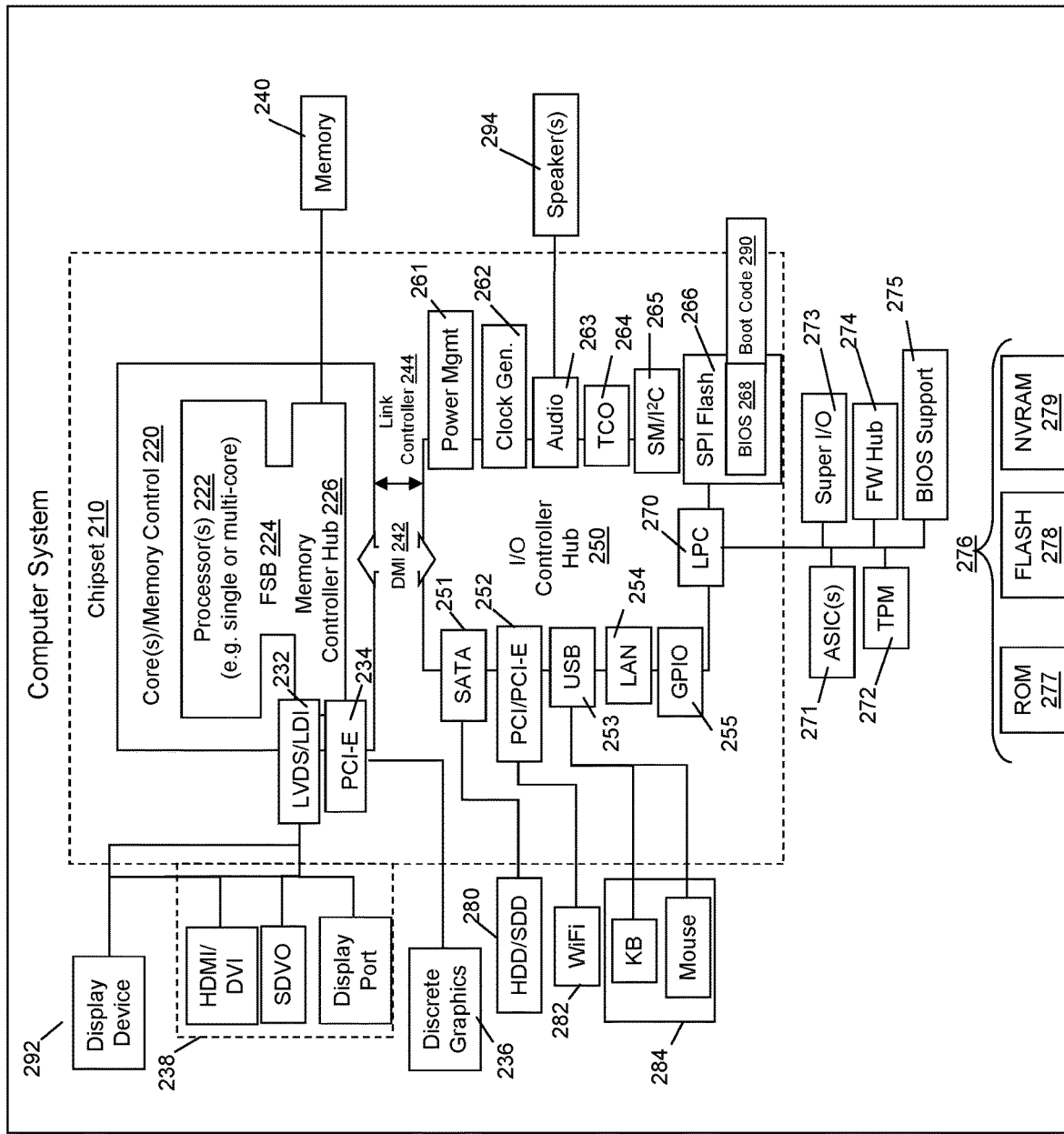
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, and/or electronic devices that may comprise a camera and that may be able to access and leverage 3D depth information from an accessible data store, such as an AR Point Cloud. For example, the circuitry outlined in FIG. 1 may be implemented in a tablet or smart phone embodiment, whereas the circuitry outlined in FIG. 2 may be implemented in a laptop.

Figure 3:
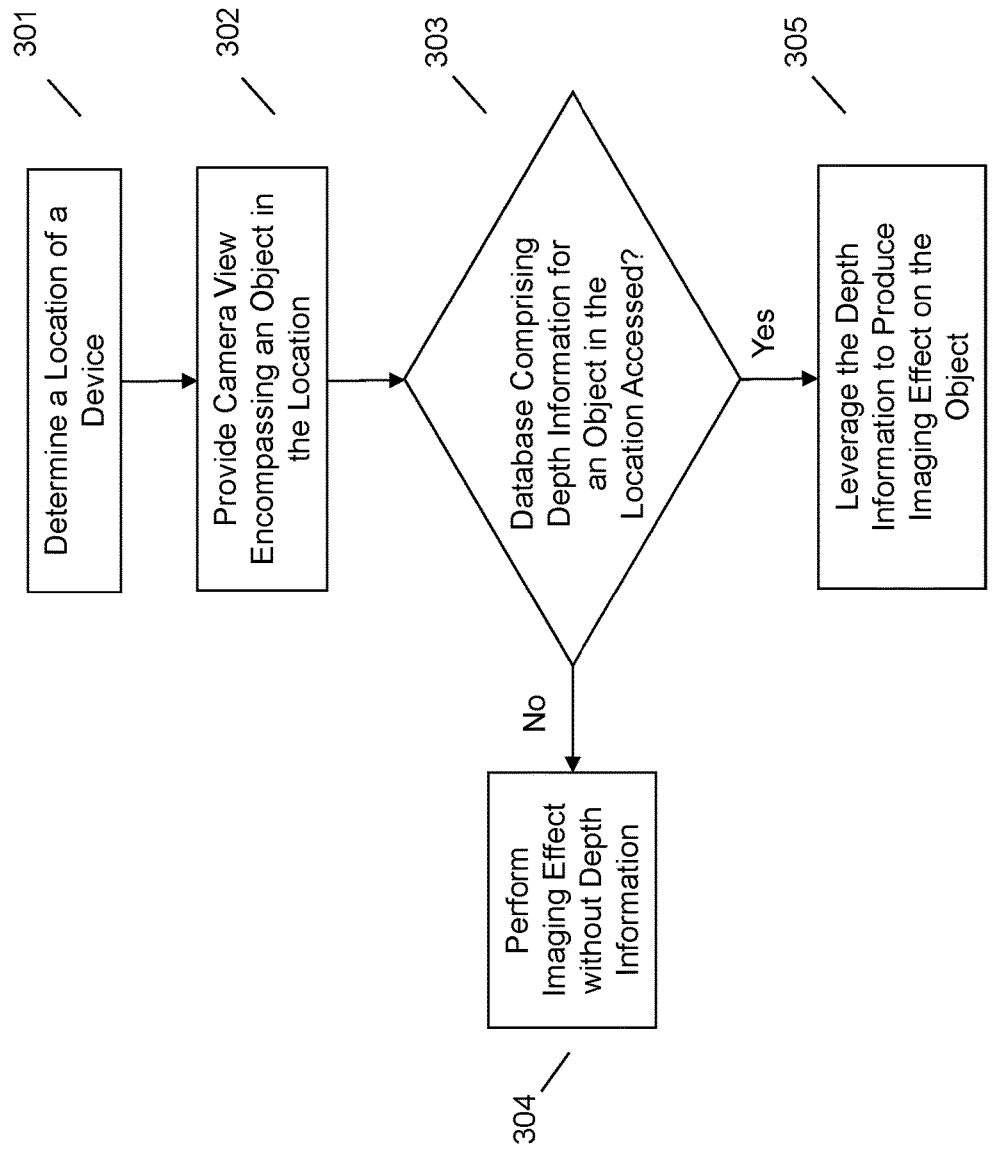
FIG. 3 illustrates an example method of leveraging depth information of objects in a space to perform a camera function.

Referring now to FIG. 3, an embodiment may leverage available 3D depth information to perform depth-based camera functions without the presence of a second camera. At 301, an embodiment may determine a location of a device. In an embodiment, one or more conventional location determining techniques may be utilized to identify the device's location (e.g., by utilizing global positioning system (GPS) data, Wi-Fi location tracking, radio frequency identification (RFID), etc.). Additionally or alternatively, an embodiment may determine a location of a device by first capturing one or more images of the surrounding area of the device. An embodiment may then compare the captured image(s) to a database comprising a plurality of images of known locations to determine whether there is a match.

At 302, an embodiment may use a camera integrated into the device to provide a camera view of the location. In the context of this application, a camera view may refer to a field of view of the camera. In an embodiment, the camera view may correspond to a view of the entire location or just a view of a portion thereof. In an embodiment, at least a portion of the location may comprise one or more physical objects (e.g., one or more human individuals, animals, plants, furniture, other animate or inanimate objects, etc.). In an embodiment, the camera providing the view may be related to a front-facing camera or a world-view camera.

At 303, an embodiment my attempt to access a data store comprising depth information for at least one object in the location. In the context of this application, depth information may correspond to depth information with respect to the user's device. Stated differently, the depth information may comprise precise values associated with how far an object is away from a user's device at virtually any point in the location. In an embodiment, the data store may be stored at a remote storage location (e.g., on a server, on another device, etc.) and may be accessed via a wired or wireless connection. For simplicity purposes, the remainder of the discussion herein will focus on an augmented reality (AR) Point Cloud as the accessible data store. However, a skilled person will realize that such a designation is not limiting and other data stores comprising readily accessible information may also be utilized.

In an embodiment, the AR Point Cloud may comprise a soft, 3D copy of a variety of different analyzed locations in the world (e.g., public locations, private locations, etc.). In this regard, the Point Cloud may comprise real world coordinates for various objects located in these locations. Accordingly, the information obtained from the AR Point Cloud may allow a device to recognize where it is in the location (e.g., to centimeter level accuracy, etc.) with respect to other known objects in the location. Additionally, a device may utilize this depth information to perform a variety of different image effects, further described herein.

In an embodiment, the AR Point Cloud may be a persistent point cloud. More particularly, the AR Point Cloud may be dynamically updated with new depth information. For example, each time a depth detecting device enters a new location, any captured depth data of the location may automatically be transmitted to the AR Point Cloud. In an embodiment, the information available on the AR Point Cloud may be readily accessible to connected devices. Stated differently, the depth information may be available substantially immediately to other devices upon access to the AR Point Cloud. Accordingly, devices may take advantage of the depth information stored in the AR Point Cloud without actually performing any depth mapping on the device. Such a benefit may decrease the processing times for various camera imaging effects (e.g., by eliminating the need for a user to scan their smartphone over a target area to obtain depth information for the area, etc.).

Responsive to not accessing, at 303, the AR Point Cloud and obtaining depth information therefrom, an embodiment may, at 304, take no additional action. Alternatively, an embodiment may perform an imaging effect without the benefit of the depth information available from the AR Point Cloud. Conversely, responsive to accessing, at 303, the AR Point Cloud and obtaining the depth information therefrom, an embodiment may, at 305, leverage the depth information to produce one or more imaging effects.

In an embodiment, an imaging effect may correspond to a depth-based imaging effect. More particularly, the integrated camera may utilize the depth knowledge of surrounding objects to produce an effect on an image. For instance, an embodiment may enact a portrait mode effect via utilization of the depth based information from the AR Point Cloud. As an example, an embodiment may obtain depth information for one or more objects in a view of the camera. An embodiment may then be able to identify a subject object (i.e., a foreground object) and one or more background objects based on this depth information. An embodiment may thereafter defocus, or blue, the background objects without blurring the foreground object. In this way, an embodiment may be able to mimic the conventional portrait mode feature available to smartphones comprising at least two cameras.

In an embodiment, the depth information available in the AR Point Cloud may also be utilized to perform an augmented reality function. For example, a user may select a real-world object, in the camera view, on which to position one or more AR objects on or nearby. As a result of the precise depth information available in the AR Point Cloud, the AR objects may appear to be seamlessly positioned on or near real-world objects, such as if the AR objects were also real-world objects.

A skilled person will realize that the foregoing depth based camera functions are not limiting, and that other camera functions, not explicitly described here, may also be performed using depth information from the AR Point Cloud.

The various embodiments described herein thus represent a technical improvement to conventional depth-based imaging effects. Using the techniques described herein, an embodiment may determine a location of a device and provide a camera view encompassing at least a portion of the location. In an embodiment, one or more objects in the portion of the location may be visible in the camera view. Then, an embodiment may access a data store, such as an AR Point Cloud, that comprises depth information the objects in the location. An embodiment may thereafter leverage this available depth information for the surrounding objects to produce an imaging effect on the objects in the camera view. For instance, an embodiment may be able to mimic the portrait mode feature available to many smartphone devices with two or more cameras. As another example, an embodiment may be able to seamlessly position AR objects on top of real world objects. Such a method may be able to produce various depth-based imaging effects with only one camera.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   determining, using a processor, a location of an information handling device;
   providing, using a camera of the information handling device, a camera view encompassing at least a portion of the location, wherein the portion encompassed by the camera view comprises at least one object;
   accessing a data store comprising depth information for the at least one object in the location, wherein the depth information is dependent on a position of the information handling device in the location;
   identifying, based on the depth information, a distance between the information handling device and the at least one object; and
   leveraging knowledge of the identified distance to produce an imaging effect on the at least one object in the camera view of the portion.

2. The method of claim 1, wherein the determining comprises determining using global positioning system (GPS) data.

3. The method of claim 1, wherein the determining comprises capturing an image of the location and thereafter comparing the image to a location database, wherein the location database comprises a plurality of images of known locations.

4. The method of claim 1, wherein the data store is an augmented reality (AR) Point Cloud.

5. The method of claim 4, wherein the AR Point Cloud is a persistent point cloud.

6. The method of claim 1, wherein the accessing comprises accessing the data store in substantially real time.

7. The method of claim 1, wherein the imaging effect comprises a camera function, the camera function comprising:
   identifying, from the at least one object, a foreground object and a background object; and
   defocusing, based on the depth information, the background object.

8. The method of claim 1, wherein the imaging effect comprises a camera function, the camera function comprising:
   providing, using the depth information, at least one augmented reality object on the at least one object.

9. The method of claim 1, wherein the camera is associated with at least one of: a front-facing camera and a world-view camera.

10. An information handling device, comprising:
a camera;
a memory device that stores instructions executable by the processor to:
determine a location of the information handling device;
provide, using the camera, a camera view encompassing at least a portion of the location, wherein the portion encompassed by the camera view comprises at least one object;
access a data store comprising depth information for the at least one object in the location, wherein the depth information is dependent on a position of the information handling device in the location;
identify, based on the depth information, a distance between the information handling device and the at least one object; and
leverage knowledge of the identified distance to produce an imaging effect on the at least one object in the camera view of the portion.

11. The information handling device of claim 10, wherein the instructions executable by the processor to determine comprise instructions executable by the processor to determine using global positioning system (GPS) data.

12. The information handling device of claim 10, wherein the instructions executable by the processor to determine comprise instructions executable by the processor to capture an image of the location and thereafter compare the image to a location database, wherein the location database comprises a plurality of images of known locations.

13. The information handling device of claim 10, wherein the data store is an augmented reality (AR) Point Cloud.

14. The information handling device of claim 13, wherein the AR Point Cloud is a persistent Point Cloud.

15. The information handling device of claim 10, wherein the instructions executable by the processor to access comprise instructions executable by the processor to access the data store in substantially real time.

16. The information handling device of 10, wherein the imaging effect comprises a camera function, the camera function comprising:
instructions executable by the processor to identify, from the at least one object, a foreground object and a background object; and
instructions executable by the processor to defocus, based on the depth information, the background object.

17. The information handling device of claim 10, wherein the imaging effect comprises a camera function, the camera function comprising:
instructions executable by the processor to provide, using the depth information, at least one augmented reality object on the at least one object.

18. A product, comprising:
a storage device that stores code, the code being executable by a processor and comprising:
code that determines a location of an information handling device;
code that provides a camera view encompassing at least a portion of the location, wherein the portion encompassed by the camera view comprises at least one object; and
code that accesses a data store comprising depth information for the at least one object in the location, wherein the depth information is dependent on a position of the information handling device in the location;
code that identifies, based on the depth information, a distance between the information handling device and the at least one object;
code that leverages knowledge of the identified distance the depth information to perform an imaging effect on the at least one object in the camera view of the portion.

* * * * *